(12) United States Patent
Schweitzer, III

(10) Patent No.: US 7,356,422 B2
(45) Date of Patent: Apr. 8, 2008

(54) APPARATUS AND METHOD FOR HIGH-SPEED LOAD SHEDDING IN AN ELECTRICAL POWER SYSTEM

(75) Inventor: Edmund O. Schweitzer, III, Pullman, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 0 days.

(21) Appl. No.: 11/582,255

(22) Filed: Oct. 16, 2006

(65) Prior Publication Data

US 2007/0239372 A1    Oct. 11, 2007

Related U.S. Application Data

(60) Provisional application No. 60/790,384, filed on Apr. 7, 2006.

(51) Int. Cl.
*G06F 19/00* (2006.01)
(52) U.S. Cl. .......................................... 702/60; 702/57
(58) Field of Classification Search .................. 702/57, 702/60
See application file for complete search history.

(56) References Cited

U.S. PATENT DOCUMENTS

| | | | |
|---|---|---|---|
| 3,704,380 A | | 11/1972 | Cohn |
| 5,289,148 A | * | 2/1994 | Siglock et al. ............... 335/202 |
| 5,604,421 A | | 2/1997 | Barnsley |
| 5,650,936 A | * | 7/1997 | Loucks et al. ................. 702/62 |
| 6,314,378 B1 | | 11/2001 | Hodge et al. |
| 6,633,802 B2 | | 10/2003 | Sodoski et al. |
| 6,737,958 B1 | * | 5/2004 | Satyanarayana ........... 340/14.1 |
| 6,745,254 B2 | | 6/2004 | Boggs et al. |
| 6,885,974 B2 | | 4/2005 | Holle |

OTHER PUBLICATIONS

Will Allen and Tony Lee, Flexible High-Speed Load Shedding Using a Crosspoint Switch, 2005, Schweitzer Engineering Laboratories, Pullman Washington.

* cited by examiner

*Primary Examiner*—John E. Barlow, Jr.
*Assistant Examiner*—Douglas N Washburn
(74) *Attorney, Agent, or Firm*—Cook, Alex, McFarron, Manzo, Cummings & Mehler, Ltd.

(57) ABSTRACT

An apparatus and method causes a response action in an electrical power distribution system having, inter alia, a plurality of intelligent electronic devices (IEDs) configured to provide protective monitoring and control of the electrical power system. The method includes detecting receipt of one of a number of matrix input signals that can be received from the plurality of IEDs, and comparing the matrix input signal to a configuration of a m×n cross-point switch matrix having a corresponding number of A[m,n] entries. Each of the n rows is associated with a matrix input signal and each of the m columns is associated with one of a number of matrix output signals that can be transmitted to the plurality of IEDs. The method also includes asserting a matrix output signal based on the comparison to cause the response action.

32 Claims, 8 Drawing Sheets

US 7,356,422 B2

APPARATUS AND METHOD FOR HIGH-SPEED LOAD SHEDDING IN AN ELECTRICAL POWER SYSTEM

CROSS-REFERENCE TO RELATED APPLICATIONS

This application claims benefit under 35 U.S.C. §119(e) of U.S. Provisional Application entitled "Apparatus and Method for High-Speed Load Shedding in an Electrical Power System," filed on Apr. 7, 2006, having Ser. No. 60/790,384, naming Edmund O. Schweitzer III as inventor, the complete disclosure thereof being incorporated by reference.

FIELD OF THE INVENTION

The present invention generally relates to power system protection, and more specifically, to an apparatus and method for high-speed load shedding in an electrical power system.

BACKGROUND OF THE INVENTION

Electrical power systems are designed to generate, transmit and distribute electrical energy to various types of electrical loads under varying conditions. Typically, these systems include a variety of power system components such as electrical generators, power transformers, power transmission lines, buses and capacitors, which require protection from abnormal conditions such as electrical short circuits, overloads, frequency excursions, voltage fluctuations, and the like.

To provide such protection power systems typically include a protective device and associated procedures which isolate power system components from the remainder of power system upon detection of an abnormal condition or a fault in, or related to, the protected component. Such protective devices may include different types of protective relays, surge protectors, arc gaps, circuit breakers and reclosers.

Isolation of one or more power system components and/or their associated loads is commonly referred to as "load shedding." Loads are shed in response to a trip signal transmitted, for example, by a protective relay to a breaker associated with distribution power system element(s) and an associated load(s). The trip signal may be issued as a result of a power source reduction or imbalance detected by the protective relay. In addition to rapid detection, effective power system stability requires fast (breaker) tripping of the correct quantity of load (kW). Because a particular load or loads can change dynamically according to the power system topology and the operating state of the power system, a decision to trip or isolate the load(s) can vary from moment to moment.

In general, load shedding schemes include a number of components designed to monitor the power system and to cause loads to be shed. This ensures that power supplying generators are not overloaded and that a balance of power is supplied by remaining generators in the event of an abnormal fault or condition. An effective load shedding scheme strives to initiate load shedding quickly in response to present power system conditions, to trip the correct amount of load as quickly as possible in order to maintain power system stability, and to avoid unnecessary operations.

While effective in most cases, prior load shedding schemes have limitations under certain conditions. For example, some prior load shedding schemes are based solely on under-frequency detection by stand-alone devices such as protective relays. When a frequency excursion is detected, the protective relay trips its associated breaker. Multiple frequency thresholds may be used in stand-alone devices throughout the power system to shed more loads if the under-frequency condition is not corrected. In addition, time delays may also be used to coordinate load tripping. These approaches, however, do not consider the amount of load (kW) being shed and the importance of each load being shed. Rather, loads are shed and then the power system frequency monitored to determine whether the power system frequency improves. If no improvement is detected, additional loads are shed.

Other prior load shedding schemes utilize a centralized processor (e.g., programmable logic controller or PLC) to make system-wide load shedding decisions. Typically these schemes require a large amount of wiring in order to gather information about the power system (power flows, breaker status, etc.). This approach may be costly in terms of installation, commissioning and maintenance of the system. Further, although PLC-based schemes can be flexible and accommodate large systems, the amount of time needed to process a load shedding algorithm increases proportionally with the complexity of the system, yielding undesirable delays in load shedding in large systems.

SUMMARY OF THE INVENTION

The invention is generally directed to a protection scheme that uses a cross-point switch matrix to enable a high-speed response action upon an occurrence of an undesirable event in a power system. In particular, a load shedding scheme is provided that utilizes a cross-point switch matrix to facilitate high-speed load shedding based on a set of input factors that take into consideration the qualities of the loads being shed.

In one embodiment of the invention, the electric power system includes, inter alia, a plurality of intelligent, microprocessor-based electronic devices (IEDs) configured to provide protective monitoring and/or control of the power system. A plurality of inputs are operatively coupled to an operator input device and the plurality of IEDs. A plurality of outputs are operatively coupled to the plurality of IEDs, and an m×n cross-point switch matrix having a corresponding number of entries A[m,n]. Each of the n rows may be associated with one of a number of matrix input signals that can be received from the plurality of IEDs, while each of the m columns may be associated with one of a number of matrix output signals that can be transmitted to the plurality of IEDs. Alternatively, each of the m columns may be associated with one of a number of matrix input signals that can be transmitted to the plurality of IEDs, while each of the n rows may be associated with one of a number of matrix input signals that can be received from the plurality of IEDs. The apparatus further includes a microprocessor operatively coupled to the plurality of inputs, the plurality of outputs and the cross-point switch matrix. The microprocessor is programmed to cause the response action based on a configuration of the cross-point switch matrix.

Each of the different matrix input signals corresponds to an undesirable event in the power system. The undesirable event may include, for example, a power deficit, an under-frequency condition, a load surplus, or an imbalance, any of which may be caused by, for example, a generator breaker trip, a switch closing, a load increase, and the like. Each of the matrix output signals corresponds to an individual load. When selected and asserted via the cross-point switch matrix configuration, a matrix output signal causes its associated load to be shed from the power system in an attempt to restore power system stability. In addition, the cross-point switch matrix is updated periodically with present power system status information and/or operator input information.

It should be understood that the present invention includes a number of different aspects and/or features which may have utility alone and/or in combination with other aspects or features. Accordingly, this summary is not an exhaustive identification of each such aspect or feature that is now or may hereafter be claimed, but represents an overview of certain aspects of the present invention to assist in understanding the more detailed description that follows. The scope of the invention is not limited to the specific embodiments described below, but is set forth in the claims now or hereafter filed.

DETAILED DESCRIPTION OF THE PREFERRED EMBODIMENTS

In general, a system and method are described which function in the manner of a simple m×n point switch matrix to cause a high-speed "response action" upon an occurrence of an "undesirable event" in a power system. The cross-point switch function is implemented by means of a complex load selection algorithm.

More specifically, a microprocessor or equivalent utilizes the cross-point switch matrix to cause the response action upon an occurrence of an undesirable event. In one embodiment, the response action can be a load shedding action, and the undesirable event can be an occurrence of a power deficit. For ease of discussion and illustration, the apparatus and method disclosed herein utilize the cross-point switch matrix in a single high-speed load shedding application. It should be understood however, that the apparatus and method disclosed herein are applicable to any number of power system applications.

By way of example, the apparatus and method disclosed herein can support two high-speed load-shedding schemes. The first scheme is based on a predicted power deficit resulting from a pre-defined trip event (i.e., source trip or tie breaker trip). In that case, the undesirable event is the pre-defined trip event that results in the predicted power deficit, and the response action is a load shedding action of an amount of load corresponding to the predicted power deficit. In the first high-speed load shedding scheme, the predicted power deficit is indicated as one of a number of "contingency triggers" (via matrix input signals) to the cross-point switch matrix. Each contingency trigger is associated with zero, one or more load shedding actions. The second scheme is based on under-frequency thresholds where each threshold may be represented as a contingency trigger (matrix input signal), and corresponds to an amount of load that must be shed (via matrix output signal) before the power system can recover from the under-frequency condition.

As described below, use of the cross-point switch matrix in a load shedding scheme enables (1) dynamic calculation of a quantity of load to be shed for each of a number of primary contingency triggers, (2) utilization of an operator-settable quantity of load to shed for each of a number of secondary contingency triggers, (3) dynamic selection of individual loads to shed based on settable priorities, measured power consumption, and the present topology of the connected power distribution system, (4) use of secure methods with high noise immunity to propagate contingency trigger and load-shed signals, and (5) a response to contingency triggers in milliseconds. As a result, power system stability is maintained.

Figure 1:
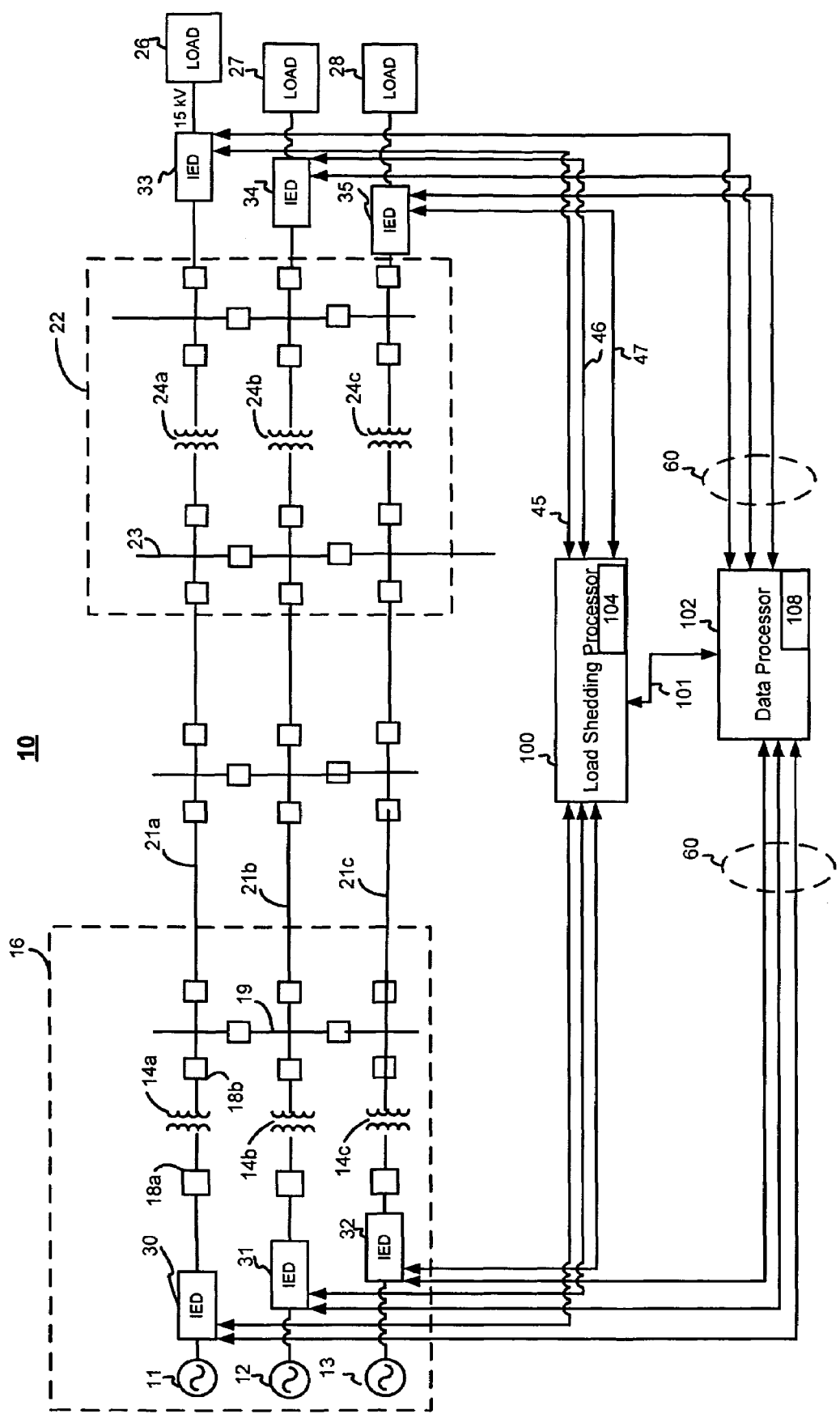
FIG. 1 is a simplified single line schematic diagram of an electrical power distribution system having a load shedding system, constructed in accordance with the invention.

Referring to the Figures, and particularly to FIG. 1, a power distribution system 10, including a load shedding system in accordance with the invention, includes, among other components, three synchronous generators 11, 12 and 13, configured to generate three-phase sinusoidal waveforms such as, typically, 12 kV sinusoidal waveforms. Also included are three step-up power transformers 14a, 14b and 14c configured to increase the generated waveforms to higher voltage sinusoidal waveforms such as 138 kV sinusoidal waveforms, and a number of circuit breakers (not shown). The step-up power transformers 14a, 14b, 14c operate to provide the higher voltage sinusoidal waveforms to a number of long-distance transmission lines such as the transmission lines 21a, 21b and 21c. In one embodiment, a first substation 16 may include the three synchronous generators 11, 12 and 13, the three step-up power transformers 14a, 14b and 14c and associated circuit breakers 18a and 18b, all interconnected via a first bus 19. A second substation 22 may include three step-down power transformers 24a, 24b and 24c configured to transform the higher voltage sinusoidal waveforms to lower voltage sinusoidal waveforms (e.g., 15 kV) suitable for distribution via one or more distribution lines to loads 26, 27 and 28, respectively.

Although single lines and associated equipment/device blocks are shown for ease of illustration, it should be noted that three-phase power and associated equipment/devices are included in the power system 10. For example, although illustrated as a single line, multiple buses 19a, 19b, etc. may be included in the bus 19.

A number of microprocessor-based intelligent electronic devices (IEDs) 30-35 are also included to monitor and control the power system 10. For example, an IED such as the IED 30 may be configured as a protective relay to monitor the A-phase current generated by the generator 11, and in the event of some abnormal condition (e.g., the A-phase current exceeds a threshold value), cause a binary trip signal to be forwarded to an associated circuit breaker. Another IED such as the IED 32 may be configured as an input/output (I/O) port to forward a binary trip signal to an associated circuit breaker. While only six IEDs are included in FIG. 1, more or fewer IEDs in one of any number of other suitable configurations may be included in the power system 10. Further, although illustrated in their respective transmission paths or feeders, it should be understood that the IEDs of FIG. 1 are typically coupled to transmission path phases and the like via step-down current and/or voltage transformers.

Figure 2:
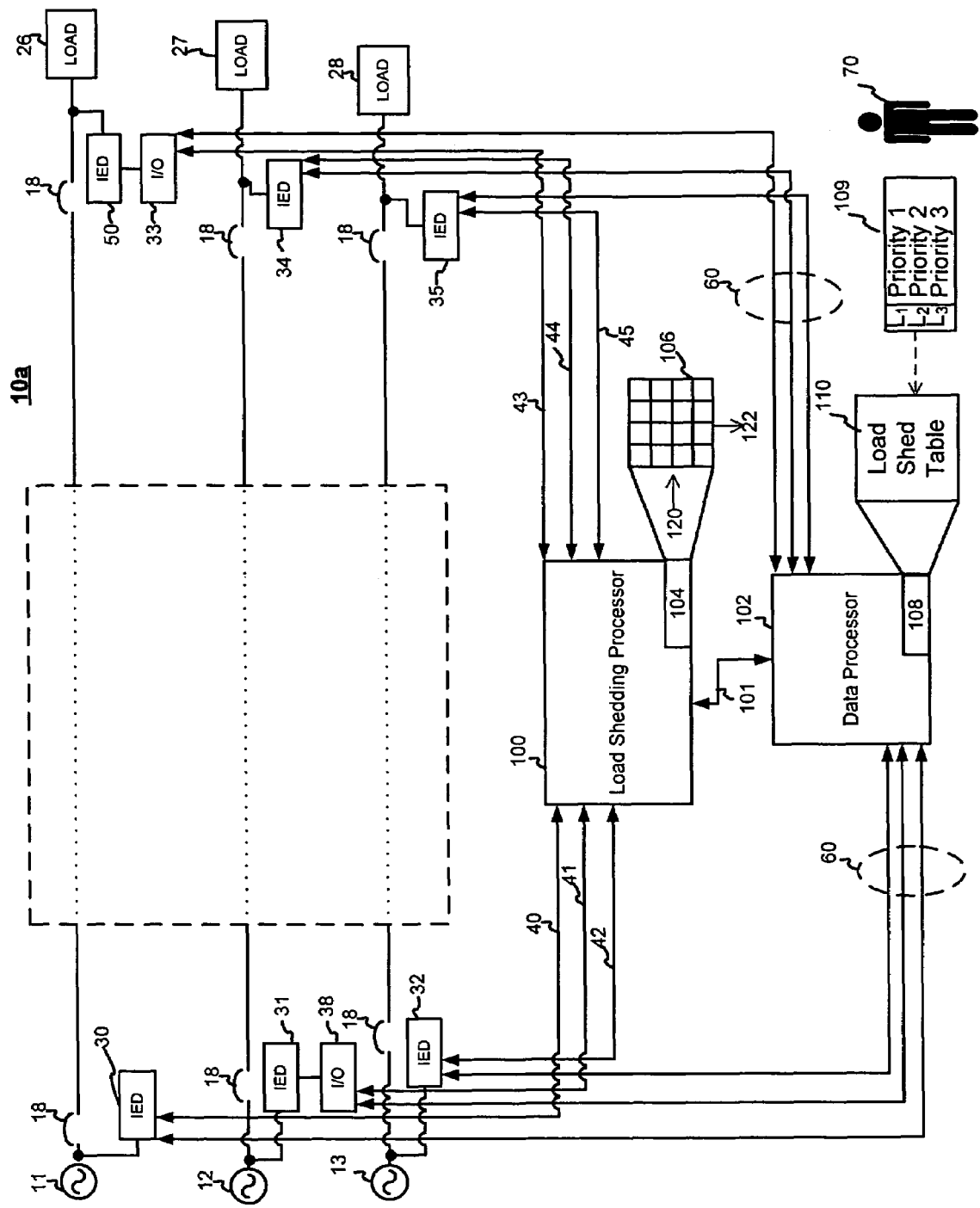
FIG. 2 is simplified partial line and partial functional block diagram of the power distribution system and the load shedding system of FIG. 1.

Also included is a load shedding processor 100 operatively coupled to each of the IEDs 30-35 and a data processor 102 operatively coupled to the load shedding processor 100 and communicatively coupled to each of the IEDs 30-35 (see, FIG. 2). The load shedding processor 100 includes a load shedding module 104 and a number of ports, inputs and outputs to enable communication with other load shedding processors, the data processor 102 and the IEDs 30-35. Similarly, the data processor 102 includes a data module 108 and a number of ports, inputs and outputs to enable communication with the load shedding processor 100, the IEDs 30-35 and an operator 70 (see, FIG. 2).

In operation, the load shedding processor 100 communicates with the data processor 102 via a communication link 101, the load shedding processor 100 communicates with each IED 30-35 via respective communication links denoted as 40-45, and the data processor 102 receives power system status information from each of the IEDs 30-35 via a communication link 60. The data processor 102 also receives operator inputs via the communication link 60.

Figure 3:
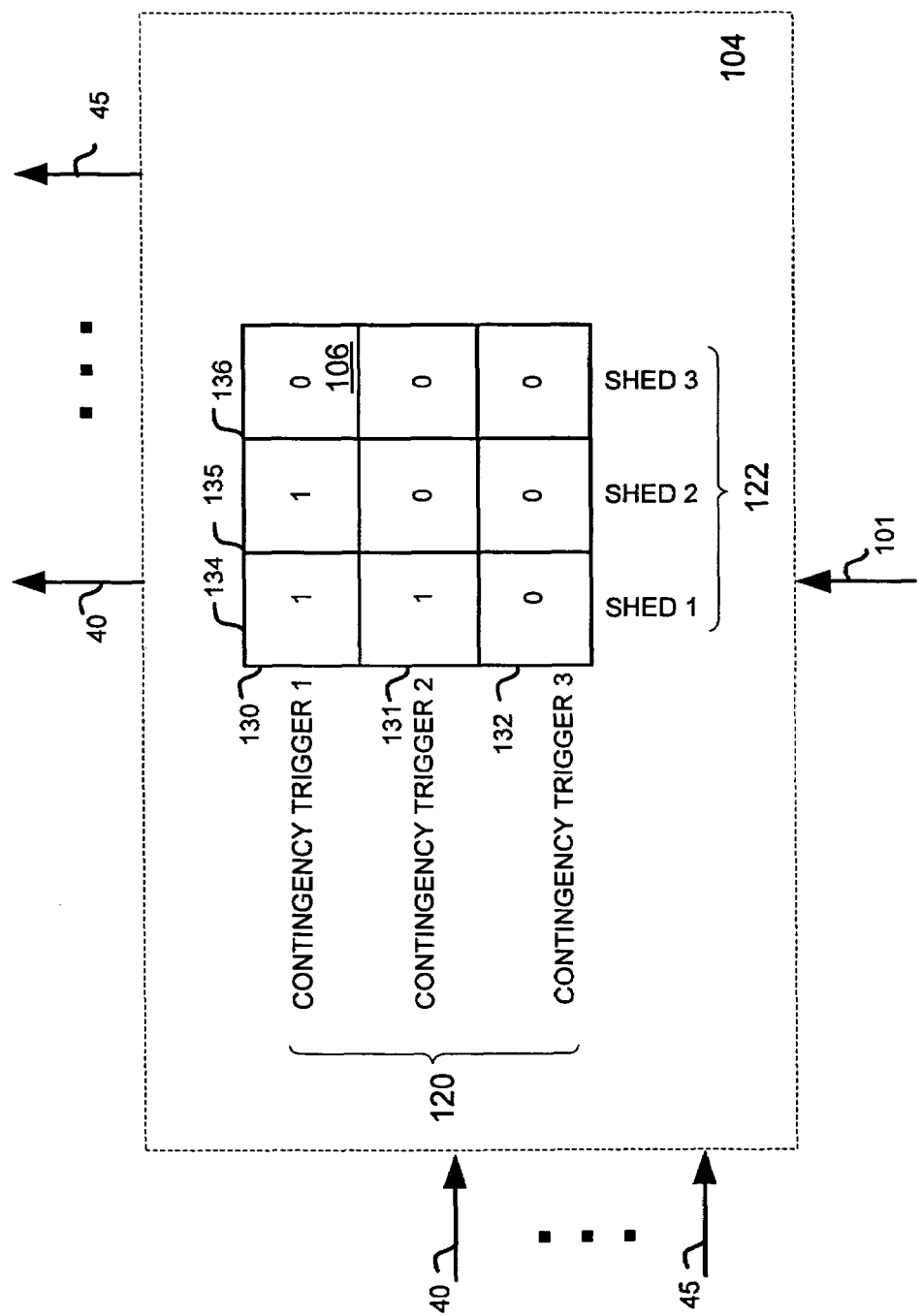
FIG. 3 is an exemplary cross-point switch matrix that may be utilized by the load shedding system of FIG. 1, according to an embodiment of the invention.

In one embodiment, the communication link 101 may be configured as a serial connection using a fast message protocol to provide periodic updates from the data processor 102 to a cross-point switch matrix 106 implemented by the load shed processor 100 (see, FIG. 3). The communication link 60 may be configured as an Ethernet-based local area network (LAN) to transmit power system data, and the communication links 40-45 may be configured as high-speed serial communication links for point-to-point communication of contact-status bits from the IEDs 30-35 to the load shedding processor 100, and from the load shedding processor 100 to the IEDs 30-35.

For ease of illustration, only one load shedding processor 100 is shown, however additional load shedding processors 100 may be utilized. It should also be noted that the data processor 102 is representative of one of many data processing configurations. For example, one data processing configuration may include multiple data processors 102, each coupled to a portion of many I/O ports of the power system 10. In addition, the functionality of the load shedding processor 100 and the data processor 102 may be combined into one apparatus. While referred to as the load shedding processor 100 having the load shedding module 104, it should be understood that the load shedding processor 100 and its associated module 104 may be configured to provide response actions other than load shedding, depending on the design of the cross-point switch matrix 106.

FIG. 2 is a more detailed partial line and partial block diagram of the power distribution system 10 of FIG. 1. Like FIG. 1 the partial block diagram of the power system 10*a* includes generators 11-13, loads 26-28, transmission lines, load shedding processor 100, data processor 102 and a number of IEDs. The partial block diagram illustrates an additional I/O port 38 operatively coupled to generator 12 via a breaker 16 and a protective relay 50 operatively coupled to load 26 via another breaker 16. In the illustrated example, IEDs 30, 31, 32 and 35, are configured as protective relays while IEDs 38 and 50 are configured as I/O ports. However, other IED configurations are possible in the power system 10*a* depending on the cross-point switch matrix application (e.g., PLCs, remote terminal units, data concentrators, and the like).

In general, the data processor 102 is configured to receive a number of power system inputs via communication link 60, and based on those inputs, to update cross-point switch matrix 106. As described in detail below, cross-point switch matrix 106 is utilized by the load shedding module 104 to make decisions regarding response actions such as which load(s) to shed upon an occurrence of an undesirable event, hereinafter referred to in a load shedding system as a contingency trigger (120 as illustrated in FIG. 3).

The power system inputs utilized by the data processor 102 include operator inputs from an operator 70. In the illustrated example, the operator inputs are provided in the form of a priority list 109 or equivalent. The priority list 109 includes load priorities that are subsequently reflected in a load shedding table 110, however other operator inputs may be used depending on the cross-point switch application. For example, in one load shedding scheme, the operator 70 may choose to prioritize load 27 over load 26, and prioritize load 28 over load 27 in the event that one or more loads are required to be shed. In that case, load 28 may include, for example, a critical portion of a city infrastructure such as a 911 call center, a hospital, etc. As noted above, the power system inputs also include power system status information received from the IEDs via the communication link 60 (e.g., power output of the generators, breaker status states, disconnect switch states, meter quantities, etc.).

The cross-point switch matrix 106 may be implemented in software, firmware, hardware or a combination thereof. In addition to load shedding schemes, cross-point switch matrix 106 may also be utilized in conjunction with other power system applications requiring decisions and/or quick response actions that are based on a number of complex and interrelated factors.

In general, cross-point switch matrix 106 uses simple rules to associate received matrix input signals (e.g., IED contact status bits); in this example contingency triggers with the load priorities provided in the load shedding table 110 to make load shedding decisions. In operation, upon receipt of a contingency trigger 120, the load shedding module 104 utilizes the combinations reflected in the cross-point switch matrix 106 to generate a response action signal(s) which, when asserted, causes a coupled IED to shed a particular load(s). In an embodiment, the combinations are indicated as a binary 1 value in a cell of the cross-point switch matrix 106, however, others may be indicated via other suitable means (e.g., a binary 0 value in a cell of the cross-point switch matrix 106).

FIG. 3 is an exemplary cross-point switch matrix 106 that can be utilized to determine and actuate response actions upon receipt of a contingency trigger(s). 120, according to an embodiment of the invention. As illustrated, each of the rows 130-132 of the cross-point switch matrix 106 corresponds to a matrix input signal; in this case, a different contingency trigger 120. Each column 134-136 corresponds to a different matrix output signal; in this case, a different response action signal 122 which when asserted, sheds an assigned load. While the exemplary cross-point switch matrix 106 depicts only three rows, and three columns, more or fewer rows or columns may be included.

Figure 4:
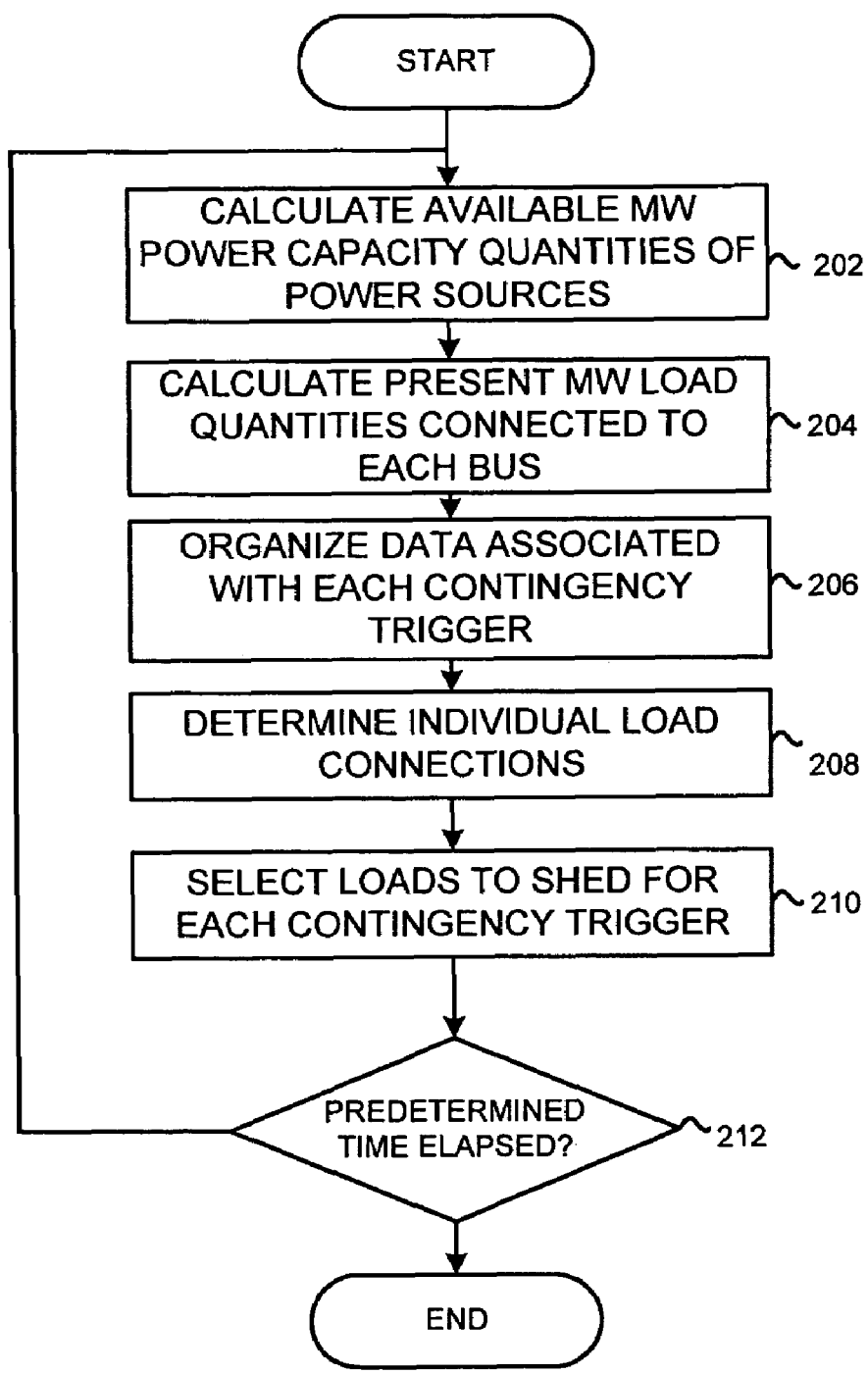
FIG. 4 is a flowchart illustrating a pre-event calculation process that may be performed by the data processor of the load shedding system of FIG. 1, according to an embodiment of the invention.

The cross-point switch matrix 106 is periodically updated by the data processor 102 as described in FIG. 4. In addition, IED status updates from IEDs 30-35 are periodically received by the load shed processor apparatus 100 via respective communication links 40-45 The IED status updates may include one or more contingency triggers 120 when they occur. Similarly, response action signals 122 are periodically transmitted by the load shed processor 100 via respective communication links 40-45. For example, the cross-point switch matrix 106 may be updated by the data processor 102 every two milliseconds, IED status updates may be transmitted from the IEDs 30-35 every 5 milliseconds, and response action signals 122 may be transmitted from the load shed processor 100 to the IEDs 30-35 every 5 milliseconds.

In operation, if one of the contingency triggers 120 occurs (e.g., a contingency trigger 1 from the IED 30 indicating that generator 11 tripped offline), the load shedding module 104 asserts all response action signals 122 associated with a binary 1 in the cross-point switch matrix row corresponding to the occurring contingency trigger. In other words, based on a configuration of the cross-point switch matrix 106, the load shedding module 104 asserts the corresponding pre-selected response action signals 122 which are transmitted to the IEDs associated with the loads to be shed, and corresponding breakers or motor contactors are tripped. The response action signals 122 are pre-selected for each contingency trigger 120 via a pre-event calculation process described in connection with FIG. 4.

Referring to FIG. 3, if a first contingency trigger is received by the load shed module 104, the module asserts response action signals Shed 1 and Shed 2, which are transmitted to the IEDs 33, 34, causing loads 26 and 27 to be shed.

Referring again to FIG. 2, the configuration of the cross-point switch matrix 106 is periodically updated. In one embodiment, the cross-point switch matrix 106 is updated every two seconds by use of load shed table 110, which is also updated every two seconds with loads to be shed for an occurrence of each contingency trigger. Such periodic updates to the cross-point switch matrix 106 are based on power system inputs including power system status information received by the data processor 102 from IEDs 30-35, and from operator entered load priorities via priority list 109. Exemplary processes for updating the cross-point switch matrix 106 are described in connection with FIGS. 4-9.

More specifically, data processor 102 is configured to continuously perform pre-event calculations to dynamically select the loads to be shed for each contingency trigger received via communication links 40-45. The pre-event calculations include determining the online status of the power system elements using the power system status information from IEDs 30-35, the topology of the power system 10a including the status of the breakers 16 located throughout the power system 10a, and the status of the loads including the run status and present power consumption of each individual load.

The pre-event calculations also include the operator inputs. In one embodiment, these operator inputs are operator-settable priorities where the operator 70 assigns each load 26-28 a unique priority. In the illustrated example, these priorities reflect the relative importance of each load 26-28 with respect to the power system 10a, and are included in the priority list 109 for subsequent use in updating the load-shedding table 110. Additionally, the operator inputs include operator-settable parameters related to the capacities of the generators 11, 12 and 13.

The pre-event calculations provide a basis upon which the data processor 102 determines which of the loads 26-28 are to be shed for an occurrence of each contingency trigger. Additionally, the pre-event calculations do not need to occur at high speed; rather, they occur before an occurrence of a contingency trigger 120. As a result, the pre-event calculations do not affect the speed at which a response action (e.g., load shedding action) will occur.

FIG. 4 is a flowchart of a pre-event calculation process 200, according to an embodiment of the invention. In the illustrated example, the pre-event calculation process 200 is performed every two seconds by the data module 108 to determine which loads are assigned to each contingency trigger in the cross-point switch matrix 106. The results of the pre-event calculation process 200 are then provided to the load-shed processor 100 for purposes of updating the cross-point switch matrix 106. Subsequent FIGS. 5-9 will further define the pre-event calculation process 200.

Referring to FIG. 4, the pre-event calculation process 200 begins when the data module 108 calculates the available MW capacity quantities of each of the power system power sources; in this example, the available MW capacity quantities of each of the generators 11, 12 and 13 (step 202). The data module 108 further calculates the present MW load quantity connected to each of a number of buses of the power system 10 (step 204) using data received via the IEDs 30-35.

Figure 5:
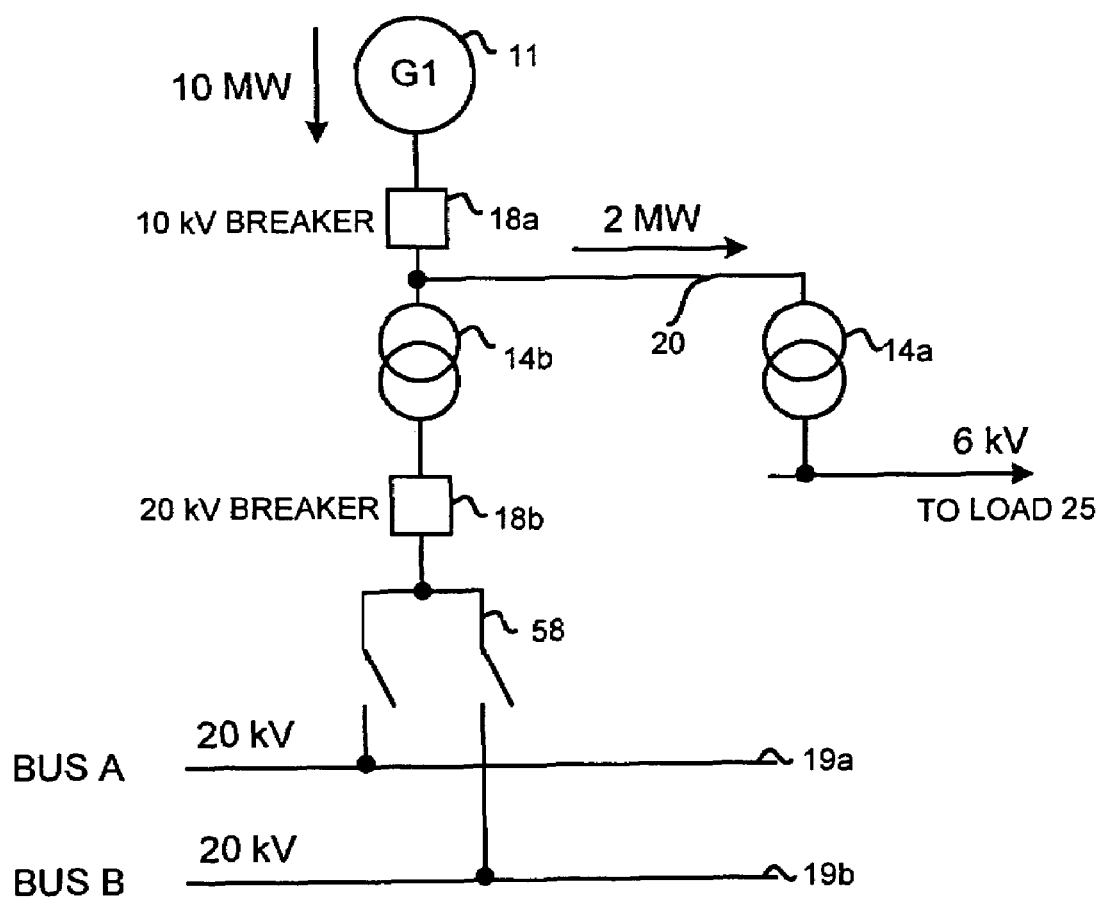
FIG. 5 is a block diagram of one of the generators and associated bus interconnections of the power distribution system of FIG. 1.

The data module 108 also organizes/assembles power system data (i.e., power system status information and operator inputs) associated with each of the contingency triggers (step 206). For example, FIG. 5 is a block diagram of the generator 11 and associated bus interconnections that may be used to organize individual contingency triggers based on the predicted power deficit that would be caused by the individual contingency triggers. Referring to FIG. 5, the generator 11 generates 10 MW of power. A 10 kV breaker 18a is positioned between a step-up transformer 14b and the generator 11, a tapped load requiring two MW of power is tapped between the first breaker 18a and the step-up transformer 14b, and a 20 kV breaker 18b is positioned between the step-up power transformer 14b and two 20 kV buses 19a and 19b (of bus 19 of FIG. 1). As a result, at least two primary contingency triggers may be organized based on the predicted power deficit that would be caused by that contingency trigger, namely:

(1) Generator 11 10 kV breaker trip; and
(2) Generator 11 20 kV breaker trip.

If the 10 kV breaker 18a trips (e.g., contingency trigger 1), the power system 10 may lose 10 MW of power generation while the power system load remains unchanged. If the 20 kV breaker 18b trips (e.g., contingency trigger 2), the power system 10 may lose 10 MW of power-generation and two MW of load. Thus the amount of load to be shed will differ depending on which contingency trigger occurs.

Secondary contingency triggers that correspond to an amount of load that must be shed before the power system 10 can recover from an under-frequency condition may include, for example, under-frequency level 1 detected on 20 kV Bus A 19a, and under-frequency level two detected on 20 kV Bus B 19b. Other contingency triggers are possible based on the configuration of the power system 10.

Referring again to FIG. 4, after organizing data associated with the contingency triggers (step 206), the data module 108 determines individual load connections (step 208) and then selects which of the loads 26-28 are to be shed for each contingency trigger (step 210). The individual load connections are determined based on the power system 10 topology. After the predetermined time period has elapsed (step 212), the pre-event calculation process 200 is repeated.

Figure 6:
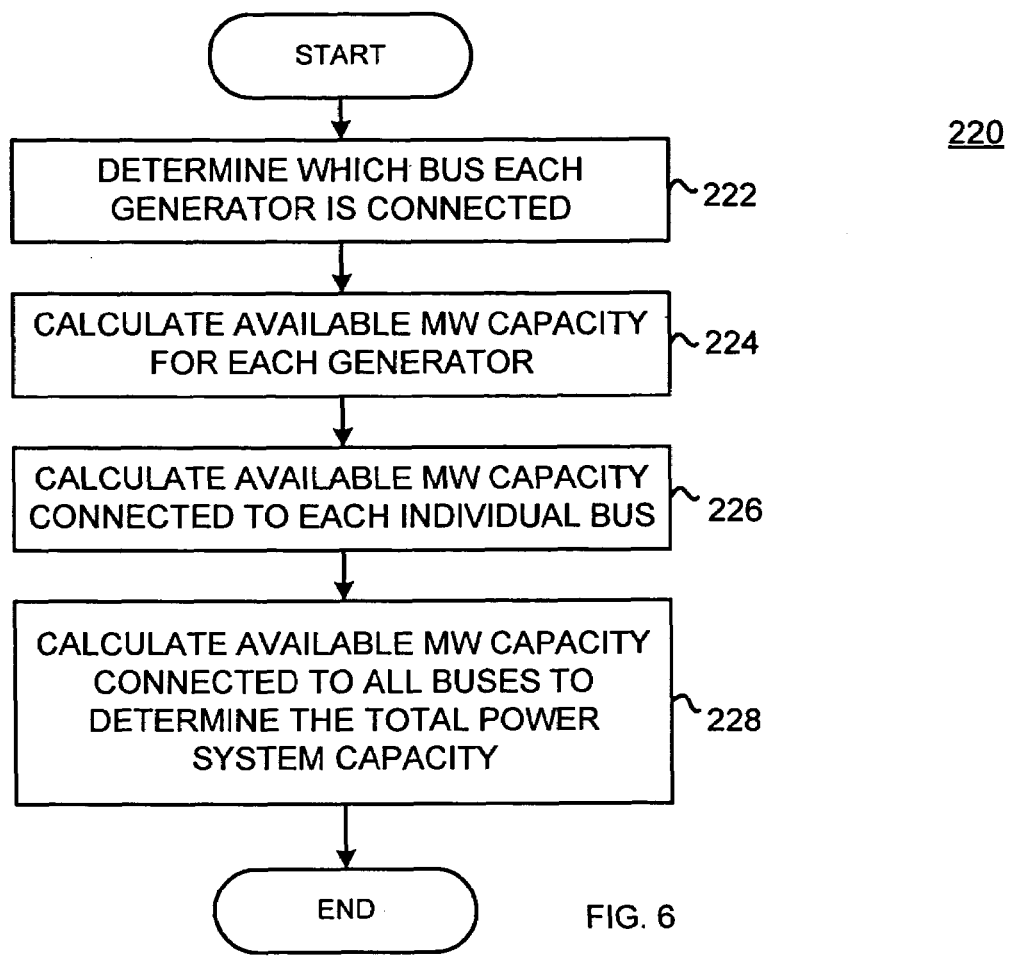
FIG. 6 is a flowchart illustrating an exemplary available capacity calculation process of the pre-event calculation process of FIG. 4, according to an embodiment of the invention.

FIG. 6 is a flowchart of an exemplary available power capacity calculation process 220 of the pre-event calculation process 200, according to an embodiment of the invention. In general, FIG. 6 illustrates the steps for calculating the available MW power capacity of each of the generators 11, 12 and 13 as shown in step 202 of FIG. 4. While discussed in terms of generators only, it should be understood that other sources of power (e.g., utility tie lines) may be included in the power system 10 and therefore included in the available capacity calculation process 220.

Referring to FIGS. 5 and 6, the available capacity calculation process 220 begins when the data module 108 examines power system status information associated with circuit breakers and disconnect switch of the power system 10 to determine which buses (e.g., the two 20 kV buses 19a, 19b) are connected to each of the generators 11-13 (step 222). Next, the data module 108 calculates the available MW capacity quantity for each of the generators 11-13 (step 224). Each generator 11-13 has a capacity that it can provide on demand. For utility tie lines, the available MW capacity may be manually entered by the operator 70. Typically, the capacity equals the rating of the associated transformer. The operator 70 may enter a capacity larger than the transformer rating and allow the transformer to be overloaded. For each of the generators 11-13, the capacity may be calculated based on a delta value, or parameter, entered by the operator 70. This parameter is the incremental amount of capacity that the generator 11, 12 and 13 can provide in the event that a contingency trigger 120 occurs. The data module 108 adds this parameter to the present power output of the generator to obtain the available capacity of the generator.

The data module 108 also calculates the available MW capacity connected to each individual bus (step 226). For example, if the generator 11 is online and connected to Bus A 19a, the data module 108 includes the capacity of generator 11 in the capacity connected to Bus A 19a. If the generator 11 is connected to Bus B 19b, the data module 108 includes the capacity of the generator in the capacity connected to Bus B 19b. The data module 108 then adds the available capacity connected to all buses. In the illustrated example, the Bus A capacity and the Bus B capacity is used to determine the total capacity of the system (step 228).

Figure 7:
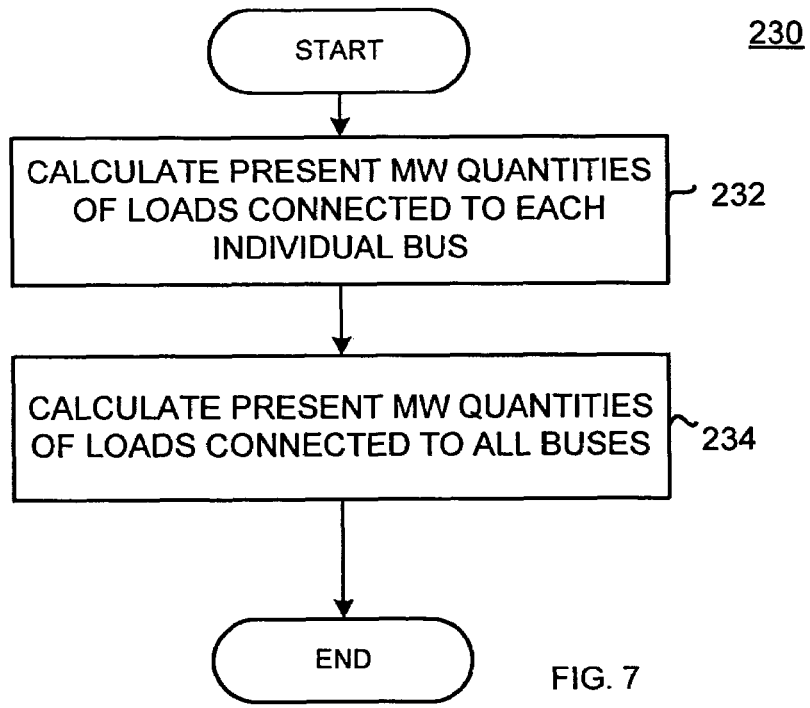
FIG. 7 is a flowchart illustrating an exemplary present capacity calculation process of the pre-event calculation process of FIG. 4, according to an embodiment of the invention.

FIG. 7 is a flowchart of an exemplary present capacity calculation process 230 of the pre-event calculation process 200, according to an embodiment of the invention. In general, FIG. 7 illustrates the steps for calculating the present MW load quantity connected to each individual bus as shown in step 204 of FIG. 4. Referring to FIGS. 5 and 7, the data module 108 calculates the load connected to each individual bus based on the connected generators 11-13 (step 232).

The data module 108 also calculates the present MW load quantities connected to all buses (step 234), and examines each generator 11-13 in the power system 10. For example, if the generator 11 is online and connected to Bus A 19a, the data module 108 includes the present output of the generator 11 in the present MW load quantities connected to Bus A 19a. Similarly, if the generator 11 is online and connected to Bus B 19b, the data module 108 includes the present output of the generator 11 in the present MW load quantities connected to Bus B 19b. If applicable, the data module 108 also examines the present power transfer across a tie breaker such as the tie breaker 58 of FIG. 5.

Referring again to FIG. 5, if the power transfer occurs from Bus A 19a to Bus B 19b, then the power transfer quantity is added to the present MW load quantity connected to Bus B 19b and subtracted from the present MW load quantity connected to Bus A 19a. If the power transfer occurs from Bus B 19b to Bus A 19a, then the power transfer quantity is added to the present MW load quantity connected to Bus A 19a and subtracted from the present MW load quantity connected to Bus B 19b.

Figure 8:
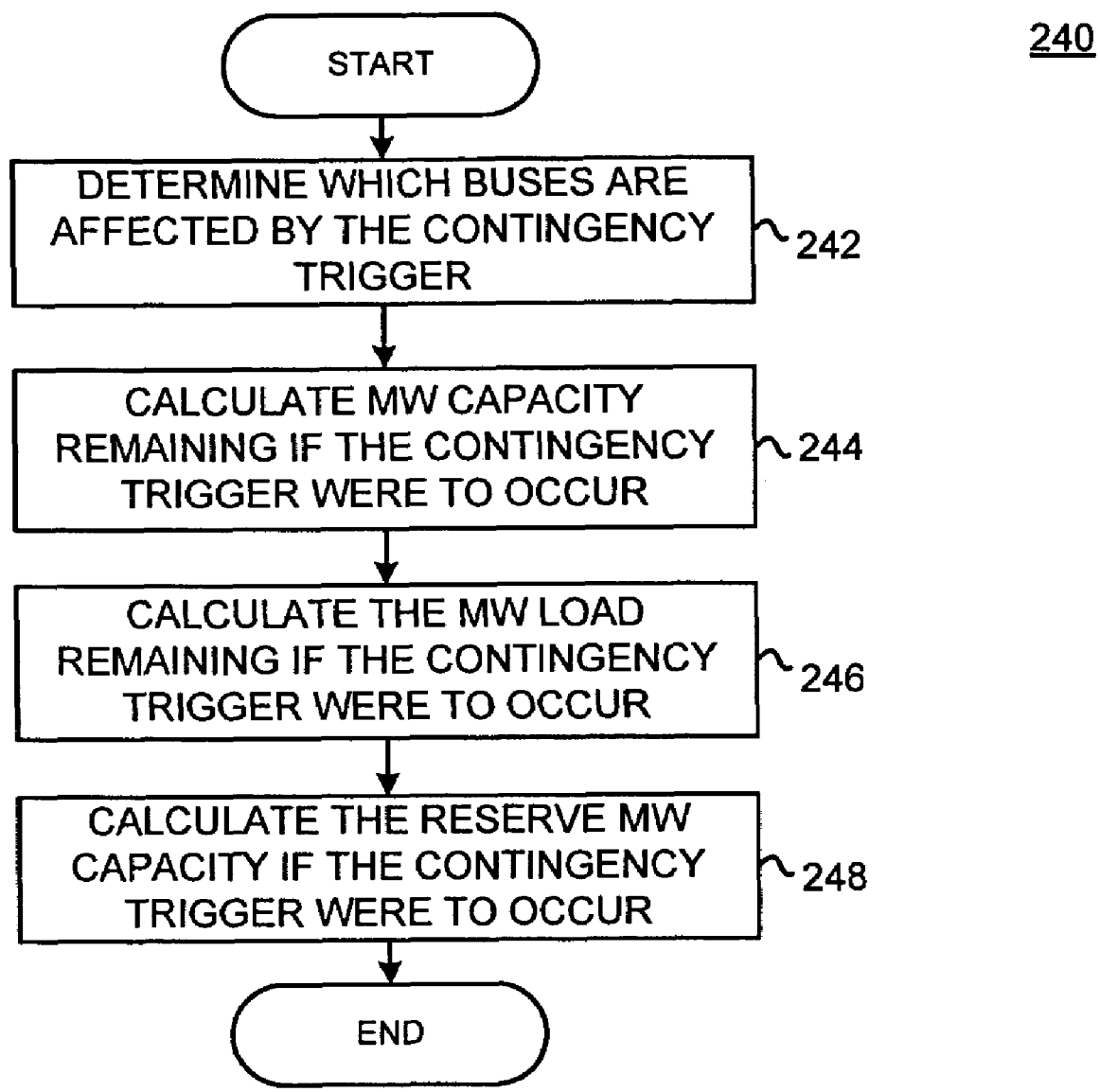
FIG. 8 is a flowchart illustrating an exemplary contingent data organization process of the pre-event calculation process of FIG. 4, according to an embodiment of the invention.

FIG. 8 is a flowchart of an exemplary contingent data organization process 240 of the pre-event calculation process 200, according to an embodiment of the invention. In general, FIG. 8 illustrates the steps for organizing data associated with the contingency triggers 120 as shown in step 206 of FIG. 4. Referring to FIGS. 5 and 8, the contingent data organization process 240 begins when the data module 108 determines, for each contingency trigger 120, which buses are affected (step 242). The determination is based on the status of the generators 11-13, the present state of tie breakers, etc., of the power system 10. For example, if generator 11 is online and connected to Bus A 19a and the 20 kV tie breaker 58 is open, a "generator 11 10 kV breaker trip" contingency trigger will affect Bus A 19a and not Bus B 19b. If the 20 kV tie breaker 58 is closed however, the generator 11 10 kV breaker trip contingency trigger will affect both Bus A 19a and Bus B 19b.

Next, for each contingency trigger 120, the data module 108 calculates the maximum MW capacity remaining after an occurrence of the contingency trigger 120 (step 244). For example, if the data module 108 determines that the generator 11 10 kV breaker trip contingency trigger affects Bus A 19a and not Bus B 19b, the MW capacity remaining after the generator 11 10 kV breaker trip contingency trigger is equivalent to the MW capacity connected to Bus A 19a less the capacity of the generator 11.

The data module 108 also calculates the load lost and/or the load remaining for each contingency trigger 120 (step 246). For example, if the data module 108 determines that the generator 11 10 kV breaker trip contingency trigger affects Bus A 19a and not Bus B 19b, the load remaining after this contingency trigger 120 is equivalent to the load connected to Bus A 19a less any load that will be lost if the generator 11 10 kV breaker trip contingency trigger occurs.

The data module 108 then calculates the reserve MW capacity for each contingency trigger 120 by subtracting the remaining MW load from the remaining MW capacity for that contingency (step 248).

$$\text{Reserve}_{CONTINGENCY} = \text{Capacity}_{CONTINGENCY} - \text{Load}_{CONTINGENCY} \quad (1)$$

If the resulting reserve MW capacity is positive, the associated contingency trigger 120 requires no load shedding. If the resulting reserve MW capacity is negative, a power deficit will exist if the associated contingency trigger 120 occurs. In that case, the data module 108 selects enough loads to account for the deficit as described in connection with FIG. 9.

As discussed above, the operator 70 assigns a unique priority to each load 26-28. These priorities reflect the relative importance of each load with respect to power system operation. The data module 108 notes each load 26-28 in order of assigned priority. For each contingency trigger 120, the data module 108 determines whether the loads 26-28 should be included in the load shedding table 110. In some cases one load may be associated with more than one contingency trigger and/or one contingency trigger may be associated with more than one load.

Figure 9:
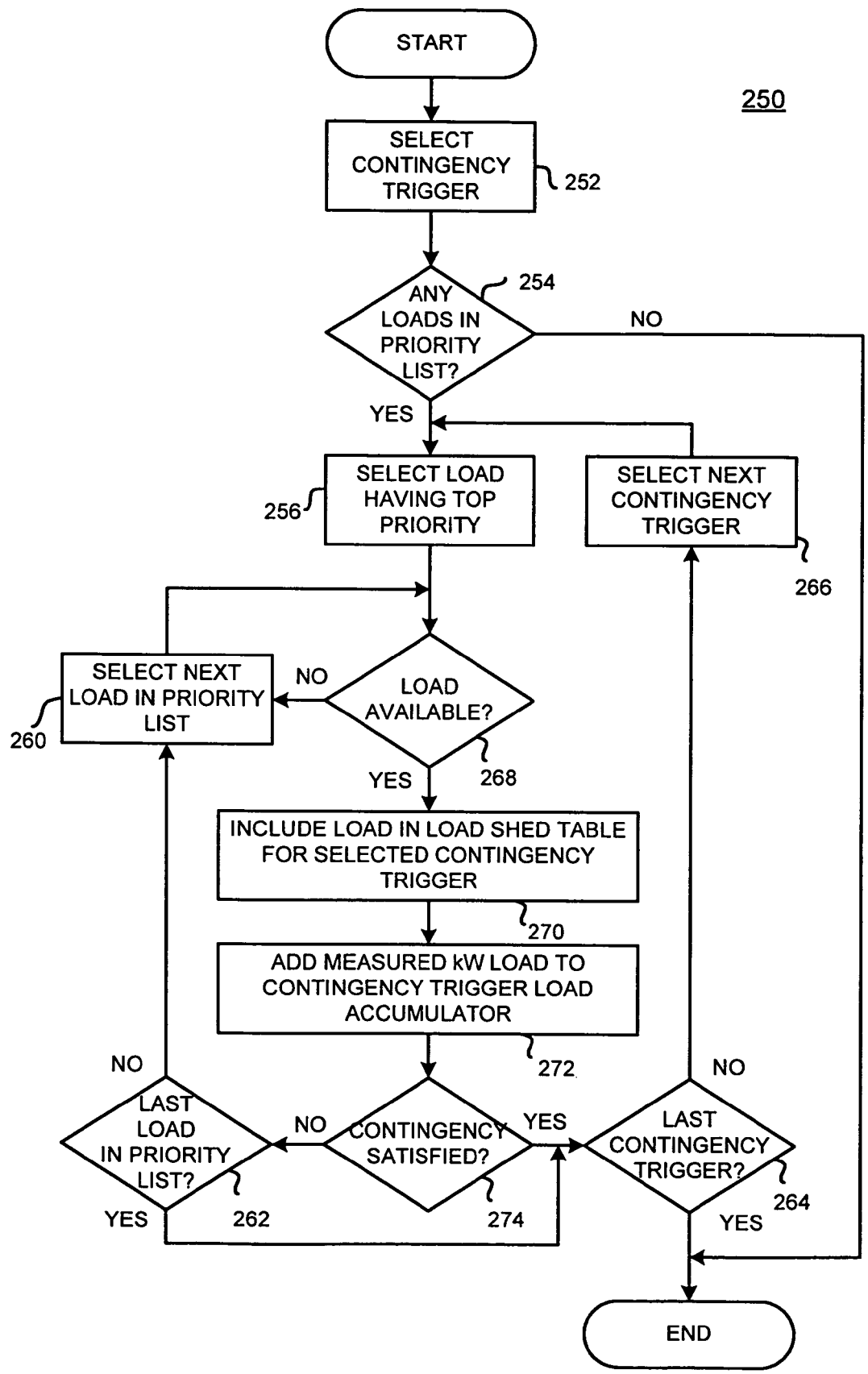
FIG. 9 is a flowchart illustrating an exemplary load selection process of the pre-event calculation process of FIG. 4, according to an embodiment of the invention.

FIG. 9 is a flowchart of an exemplary load selection process 250 of the pre-event calculation process 200, according to an embodiment of the invention. In general, FIG. 9 illustrates the steps for determining which loads are to be shed for each contingency trigger 120 as shown in step 210 of FIG. 4. The determination is based upon a number of factors including the contingency triggers selected for the cross-point switch matrix 106, and is decided on a per contingency trigger basis.

The data module 108 "accumulates" an amount of load for each contingency trigger 120. Actual measured power of each load and operator-assigned priorities are used in the accumulation. Upon accumulating an amount of load equal or greater to a calculated power deficit that would result from an occurrence of the contingency trigger (e.g., loss of 10 MW of power), the data module 108 ceases selecting loads for that particular contingency trigger, and moves to the next contingency trigger. The process is repeated until all of the contingency triggers have been addressed or until there are no more loads available for selection. The data module 108 then organizes the results of the load selection process 250 into at least one load shed table 110 and periodically writes the load shed table values into the cross-point switch matrix 106 (e.g., every two seconds).

In one embodiment, the data module 108 excludes a load from pre-event calculation process 250 if: (1) the communication channel link 41-45 used to trip the load is not healthy; (2) the communication channel link 60 used to collect MW measurements for the load is not healthy; (3) the kW measurement for the load is out of a predetermined kW range; or, (4) a tie breaker is open and the data module 108 cannot determine which bus (e.g., bus A 19a of FIG. 5) is supplying power to the load. Conversely, the data module 108 includes a load in the pre-event calculation process 230 if: (1) the load has not been excluded; (2) if the load is connected to a bus that is affected by the contingency trigger; and (3) if insufficient load has been selected to offset a power deficit calculated for the contingency trigger.

More specifically, the pre-event calculation process 250 begins when the data module 108 selects a contingency trigger 120 (step 252), and if there are any loads in the priority list 109 (step 254), selects the load having the top priority from the priority list 109 (step 256). If the load having the top (first) priority is not available because, for example, its communication channel link is not healthy (step 268), the data module 108 selects the load having the next priority (step 260). If the load having the top priority is available and is selected (step 268), the data module 108 includes it in the load shed table 110 for the selected contingency trigger (step 270). The data module 108 then adds a measured kW value of the selected load into a contingency trigger load accumulator (step 272) that sums together measured kW load values per contingency trigger.

If the accumulated measured kW values of the load(s) are equal to or greater than a calculated power deficit that would result from an occurrence of the selected contingency trigger (step 274) and all of the contingency triggers have been addressed (step 264), the load selection process 250 ends. The pre-event calculation process 250 repeats after the predetermined time has elapsed.

If the accumulated measured kW values of the load(s) are equal to or greater than a calculated power deficit that would result from an occurrence of the selected contingency trigger (step 274) and all of the contingency triggers have not been addressed, the next contingency trigger is selected (step 266), and the process is repeated starting with step 256. If the accumulated measured kW values of the load(s) are less than the calculated power deficit that would result from an occurrence of the selected contingency trigger (step 274) and there are remaining loads in the priority list 109 (step 262), the data module 108 selects the load having the next priority (step 260), and the process is repeated starting with step 268.

In summary, load shedding (or other response actions) occurs at a high speed in response to receipt of contingency triggers 120 by the load shedding module 104 via use of the cross-point switch matrix 106. Pre-event calculations including the state of the power system and load priorities are used to periodically update the cross-point switch matrix 106. In operation, when the load shedding module 104 detects one or more contingency triggers 120 (e.g., the generator 11 trips offline) from the IEDs 30-35, the load shedding module 104 causes the load(s) corresponding to the contingency trigger(s) 120 to be shed (i.e., causes associated breakers to trip) based on the information included in the cross-point switch matrix 106. Thus, in accordance with the invention, all decisions regarding which loads to trip are incorporated into the cross-point switch matrix 106 before detection of one or more contingency triggers 120, thereby enabling quickly executed response actions.

The present method may be implemented as a computer process, a computing system or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

In one embodiment, the logical operations of the present method are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

While this invention has been described with reference to certain illustrative aspects, it will be understood that this description shall not be construed in a limiting sense. Rather, various changes and modifications can be made to the illustrative embodiments without departing from the true spirit, central characteristics and scope of the invention, including those combinations of features that are individually disclosed or claimed herein. Furthermore, it will be appreciated that any such changes and modifications will be recognized by those skilled in the art as an equivalent to one or more elements of the following claims, and shall be covered by such claims to the fullest extent permitted by law.

What is claimed is:

1. An apparatus for a high-speed response action in an electric power system, the electric power system including a plurality of intelligent electronic devices (IEDs), the apparatus comprising:
   a plurality of inputs operatively coupled to the plurality of jEDs and an operator input device;
   a plurality of outputs operatively coupled to the plurality of IEDs;
   an m×n cross-point switch matrix including a corresponding number of A [m,n] entries, each of n rows associated with one of a number of matrix input signals that can be received from the plurality of IEDs and each of m columns associated with one of a number of matrix output signals that can be transmitted to the plurality of IEDs; and
   a microprocessor operatively coupled to the plurality of inputs, the plurality of outputs and the cross-point switch matrix, the microprocessor programmed to cause the response action based on a configuration of the cross-point switch matrix.

2. The apparatus of claim 1, wherein the microprocessor is programmed to:
   detect receipt of a matrix input signal of the number of matrix input signals;
   compare the matrix input signal to a configuration of the cross-point switch matrix; and
   assert a matrix output signal of the number of matrix output signals based on the comparison, assertion of the matrix output signal causing the response action.

3. The apparatus of claim 2, wherein the response action is executed via an IED of the plurality of IEDs upon receipt of the matrix output signal by the IED.

4. The apparatus of claim 2, wherein the microprocessor is programmed to assert the matrix output signal if an entry corresponding to the matrix output signal and the matrix input signal has a binary high value.

5. The apparatus of claim 2, wherein the microprocessor is programmed to assert the matrix output signal if an entry corresponding to the matrix output signal and the matrix input signal has a binary low value.

6. The apparatus of claim 1, wherein the microprocessor is programmed to periodically update the cross-point switch matrix based on power system status information and operator input information.

7. The apparatus of claim 6, wherein the power system status information is provided via the plurality of IEDs and the operator input information is provided via the operator input device.

8. The apparatus of claim 6, wherein the power system status information is at least one selected from the group consisting of generator power output, breaker status states, disconnect switch states, meter quantities and load quantities.

9. The apparatus of claim 6, wherein the operator input information comprises power system load priorities.

10. The apparatus of claim 1, wherein each of a first portion of the number of matrix input signals corresponds to a different under-frequency condition of the power system.

11. The apparatus of claim 10, wherein each of a second portion of the number of matrix input signals correspond to a different generator breaker trip of the power system.

12. The apparatus of claim 1, wherein each of the number of matrix output signals corresponds to a different load of the power system, and wherein the response action comprises a load shedding action.

13. The apparatus of claim 1, wherein each of the plurality of IEDs is at least one selected from the group consisting of a protective relay, an input/output port device, a meter, a programmable logic controller, a remote terminal unit and a data concentrator.

14. An apparatus for causing a high-speed response action in an electric power system, the electric power system including a plurality of intelligent electronic devices (IEDs), the apparatus comprising:
   a plurality of inputs operatively coupled to the plurality of IEDs and an operator input device;
   a plurality of outputs operatively coupled to the plurality of IEDs;
   an m×n cross-point switch matrix including a corresponding number of A [m,n] entries, each of m columns associated with one of a number of matrix input signals that can be received from the plurality of IEDs and each of n rows associated with one of a number of matrix output signals that can be transmitted to the plurality of IEDs; and
   a microprocessor operatively coupled to the plurality of inputs, the plurality of outputs and the cross-point switch matrix, the microprocessor programmed to cause the response action based on a configuration of the cross-point switch matrix.

15. The apparatus of claim 14, wherein the microprocessor is programmed to:
   detect receipt of a matrix input signal of the number of matrix input signals;
   compare the matrix input signal to a configuration of the cross-point switch matrix; and
   assert a matrix output signal of the number of matrix output signals based on the comparison, assertion of the matrix output signal causing the response action.

16. A method for causing a high-speed response action in an electric power system, the electric power system including a plurality of intelligent electronic devices (IEDs), the method comprising:
   detecting receipt of a matrix input signal of a number of matrix input signals that can be received from plurality of IEDs;
   comparing the matrix input signal to a configuration of a m×n cross-point switch matrix, the cross-point switch matrix including corresponding number of A [m,n] entries, each of n rows associated with one of the number of matrix input signals and each of m columns associated with one of a number of matrix output signals that can be transmitted to the plurality of IEDs; and
   asserting a matrix output signal of the number of matrix output signals based on the comparison, assertion of the matrix output signal causing the response action.

17. The method of claim 16, wherein the response act on is executed via an IED of the plurality of IEDs.

18. The method of claim 16, further comprising asserting the matrix output signal upon an occurrence of the matrix input signal if an entry corresponding to the matrix output signal and the matrix input signal has a binary high value.

19. The method of claim 16, further comprising asserting the matrix output signal upon an occurrence of the matrix input signal if an entry corresponding to the matrix output signal and the matrix input signal has a binary low value.

20. The method of claim 16, wherein each of a first portion of the number of matrix input signals corresponds to a different under-frequency condition of the power system.

21. The method of claim 20, wherein each of a second portion of the number of matrix input signals corresponds to a different generator breaker trip of the power system.

22. The method of claim 16, wherein each of the number of matrix output signals corresponds to a different load of the power system, and wherein the response action comprises a load shedding action.

23. The method of claim 16, further comprising periodically updating the cross-point switch matrix based on power system status information and operator input information.

24. The method of claim 23, wherein the power system status information is provided via the plurality of IEDs.

25. The method of claim 24, wherein the power system status information is at least one selected from the group consisting of generator power output breaker status states, disconnect switch states, meter quantities and load quantities.

26. The method of claim 23, wherein the operator input information is provided via an operator input device.

27. The method of claim 26, wherein the operator input information comprises power system load priorities.

28. The method of claim 23, further comprising:
calculating available power capacity quantities for each a number of power sources of the power system;
calculating present load quantities of a plurality power system loads of the power system;
organizing matrix input data associated with the number of matrix input signals;
determining a plurality of individual load connections of the power system based on a topology of the power system;
selecting at least one load of the plurality of power system loads to be shed for an occurrence of each of the number of matrix input signals to form, a load shedding table; and
updating the cross-print switch matrix based on the load shedding table.

29. The method of claim 16, wherein each of the plurality of IEDs is at least one selected from the group consisting of a protective relay, an input port device, a meter, a programmable logic controller, a remote terminal unit and a data concentrator.

30. A method for causing a load shedding action in an electric power system, the electric power system including a plurality of power source, a plurality of loads and a plurality of intelligent electronic devices (IEDs) the method comprising:
detecting receipt of a contingent trigger of a number of contingent triggers that can be received from the plurality of IEDs, the contingent trigger indicating a power reduction in a portion of the electric power system;
comparing the contingent trigger to a configuration of a m×n cross-point switch matrix the cross-point switch matrix having a corresponding number of A [m,n] entries, each of n rows associated with one of the number of contingent triggers and each of m columns associated with one of a number of load shedding signals that can be transmitted to the plurality of IEDs, each of the number of load shedding signals corresponding to a different load of the plurality of loads; and
asserting a load shedding signal of the number of load shedding signals if an entry corresponding to the received contingent trigger and an associated load shedding signal and has a predetermined binary value.

31. The method of claim 30, wherein the load shedding action is executed upon receipt of the load shedding signal by the IED.

32. The method of claim 30, wherein each of a first portion of the number of contingent triggers corresponds to a different under-frequency condition of the power system, and wherein each of a second portion of the number of contingent triggers corresponds to a different generator breaker trip power system.

* * * * *

UNITED STATES PATENT AND TRADEMARK OFFICE
CERTIFICATE OF CORRECTION

PATENT NO.        : 7,356,422 B2                                         Page 1 of 1
APPLICATION NO.   : 11/582255
DATED             : April 8, 2008
INVENTOR(S)       : Edmund O. Schweitzer, III It is certified that error appears in the above-identified patent and that said Letters Patent is hereby corrected as shown below:

Claim 1 Column 13, Line 7, should read:

--IEDs and an operator input device--

Signed and Sealed this

Twenty-ninth Day of July, 2008

JON W. DUDAS
*Director of the United States Patent and Trademark Office*